United States Patent
Shi et al.

(10) Patent No.: US 8,192,812 B2
(45) Date of Patent: Jun. 5, 2012

(54) OVERMOLDED CONTAINERS AND METHODS OF MANUFACTURE AND USE THEREOF

(75) Inventors: Yu Shi, Branchburg, NJ (US); Daniel J. Durham, Toledo, OH (US); Robert L. Readdy, Hopatocong, NJ (US)

(73) Assignees: The Coca-Cola Company, Atlanta, GA (US); Colgate-Palmolive Company, New York, NY (US)

( * ) Notice: Subject to any disclaimer, the term of this patent is extended or adjusted under 35 U.S.C. 154(b) by 586 days.

(21) Appl. No.: 11/307,700

(22) Filed: Feb. 17, 2006

(65) Prior Publication Data

US 2006/0210746 A1    Sep. 21, 2006

Related U.S. Application Data

(60) Provisional application No. 60/661,736, filed on Mar. 15, 2005.

(51) Int. Cl.
| | |
|---|---|
| B32B 27/08 | (2006.01) |
| B02C 23/20 | (2006.01) |
| B29C 47/02 | (2006.01) |
| B29C 45/14 | (2006.01) |
| B29C 49/08 | (2006.01) |
| B29C 49/22 | (2006.01) |
| B29D 22/00 | (2006.01) |

(52) U.S. Cl. ....... 428/35.7; 264/523; 264/513; 264/516; 264/532; 264/535; 241/19

(58) Field of Classification Search .............. 428/35.7, 428/36.9, 36.91; 425/126.1; 264/513, 516, 264/523, 532, 535; 241/19
See application file for complete search history.

(56) References Cited

U.S. PATENT DOCUMENTS

| | | | |
|---|---|---|---|
| 4,149,839 A | 4/1979 | Iwawaki et al. | |
| 4,535,901 A | 8/1985 | Okudaira et al. | |
| 4,543,364 A * | 9/1985 | Nankee et al. | 521/40 |
| 4,604,257 A | 8/1986 | Smith et al. | |
| 4,830,188 A | 5/1989 | Hannigan et al. | |

(Continued)

FOREIGN PATENT DOCUMENTS

| | | |
|---|---|---|
| JP | 04146118 | 5/1992 |
| JP | 09193303 | 7/1997 |
| JP | 11005275 | 1/1999 |

(Continued)

OTHER PUBLICATIONS

EnergyWeb http://www.energyweb.net/gas/jargon/default.asp?u_letter=p&offset=40 1997-2002.*

(Continued)

Primary Examiner — Rena Dye
Assistant Examiner — Erik Kashnikow
(74) Attorney, Agent, or Firm — Sutherland Asbill & Brennan LLP (57) ABSTRACT

Overmolded containers and methods of manufacture thereof are disclosed, which may provide enhanced visual and tactile characteristics, enabling innovative packaging designs, improved grippability and thermal insulation. The containers can be made cost effectively manner, with minimal impact on polymer recycling streams. The methods of making the container include the steps of providing a container preform which comprises a thermoplastic polymer, such as a PET copolymer; overmolding an elastomeric material over at least a portion of the preform to form an overmolded preform; and blow-molding the overmolded preform to form an overmolded container. In one embodiment, the overmolded container is a beverage container.

39 Claims, 7 Drawing Sheets

U.S. PATENT DOCUMENTS

| | | | | |
|---|---|---|---|---|
| 4,900,612 A * | 2/1990 | Sato et al. | | 428/216 |
| 4,959,421 A * | 9/1990 | Hirahara et al. | | 525/437 |
| 4,997,707 A * | 3/1991 | Otawa et al. | | 428/319.3 |
| 5,013,508 A | 5/1991 | Troester | | |
| 5,681,628 A | 10/1997 | Niederst et al. | | |
| 5,688,570 A * | 11/1997 | Ruttinger, Sr. | | 428/35.7 |
| 5,733,617 A | 3/1998 | Baduel | | |
| 5,780,129 A | 7/1998 | Ohta | | |
| 5,851,471 A * | 12/1998 | Schloss et al. | | 264/250 |
| 5,888,598 A | 3/1999 | Brewster et al. | | |
| 5,968,558 A | 10/1999 | Kudert et al. | | |
| 6,004,638 A | 12/1999 | Kaya et al. | | |
| 6,112,951 A | 9/2000 | Mueller et al. | | |
| 6,322,738 B1 | 11/2001 | Sicilia et al. | | |
| 6,352,426 B1 | 3/2002 | Hutchinson et al. | | |
| 6,426,128 B1 | 7/2002 | Kimmel et al. | | |
| 6,485,804 B1 | 11/2002 | Nakamachi et al. | | |
| 6,676,883 B2 | 1/2004 | Hutchinson et al. | | |
| 6,808,820 B2 * | 10/2004 | Lee et al. | | 428/480 |
| 2002/0193523 A1 | 12/2002 | Akkapeddi et al. | | |
| 2004/0171766 A1* | 9/2004 | Agrawal | | 525/452 |
| 2004/0212120 A1* | 10/2004 | Giraud | | 264/102 |
| 2005/0011892 A1 | 1/2005 | Nakajima et al. | | |
| 2009/0194915 A1 | 8/2009 | Hill | | |

FOREIGN PATENT DOCUMENTS

| | | |
|---|---|---|
| JP | 2000079928 | 3/2000 |
| JP | 2000271991 | 10/2000 |

OTHER PUBLICATIONS

Schneider "Practical Guidelines for Molding TPE's. A Molders Perspective" TPEs 2000 New Century Prog.Oppor., pp. 187-199 (1999).*

Product Information, Affinity PG 1140G: Dow Plastics, two pages (Apr. 2003).

Batistini, "New Polyolefin Plastomers and Elastomers made with Insite Technology: Structure—Property Relationship and Benefits in Flexible Thermoplastic Applications," Macromol. Symp. 100:137-42 (1995).

EXACT® Plastomers, ExxonMobil.Chemical, two pages (2001).

Santoleri, "Overmolding and Co-Extruding Melt-Processible Rubber on Rigid Substrates," Rubber World, four pages, vol. 222, No. 2 (May 2000).

Schneider, "Practical Guidelines for Overmolding TPEs—A Molder's Perspective," TPE's 2000: New Century Prog. Oppor., pp. 187-199 (1999).

Tam, et al., "Multi-Component Injection Molding with TPEs," TPE's 2000: New Century Prog. Opport., pp. 203-216 (1999).

TEKBOND® Thermoplastic Elastomer—Teknor Apex Company, one page (Jun. 2003).

Weng, et al., "TPE Overmolding Compounds for the Next Millenium," ANTEC '99, pp. 3483-3488 (1999).

European Patent Office, Communication of Notices of Opposition from the European Patent Office dated Apr. 23, 2010, for European Patent No. 1877237.

Communication of Response to Opposition filed with European Patent Office on Dec. 3, 2010, for European Patent No. 1877237.

Lee, Norman C., Blow Molding Design Guide, p. 124 (1998) Hanser/Gardner Publications, Munich/Cincinatti.

Bhowmick, Anil K., et al., Handbook of Elastomers 2d Ed., p. 368 (2001) Marcel Deckker Inc, United States.

Sirota, A.G., Polyolefins: Modification of Structure and Properties, p. 20 (1971) Keter Press, Israel.

* cited by examiner

OVERMOLDED CONTAINERS AND METHODS OF MANUFACTURE AND USE THEREOF

CROSS-REFERENCE TO RELATED APPLICATIONS

This application claims the benefit of U.S. Provisional Application No. 60/661,736, filed Mar. 15, 2005. The application is incorporated herein by reference in its entirety.

BACKGROUND OF THE INVENTION

This invention relates generally to molded polymeric containers, and more particularly to methods for making overmolded containers, which may enhance certain functionalities of the container, such as surface texture and hand feeling, coloration and other visual design variables, thermal insulation, and other functions.

Polyethylene terephthalate (PET) based polyesters have been widely used as container materials because of their good mechanical properties and barrier properties. Containers made from PET, however, typically have hard and smooth surfaces. These surfaces are difficult to grip, and containers can slip from a consumer's hand, causing the container contents to spill. This loss of grip is often exacerbated when a filled container product (e.g., a bottle containing a beverage) that has been stored at low temperature (e.g., in a refrigerator) is taken out for use at room temperature such that water condenses onto the outside of the container. It therefore would be highly desirable to improve the grippability of PET containers, as well as other thermoplastic polymeric containers, especially for product containers that frequently find use in conditions under which condensation forms on the outside of the containers. As used herein, the terms "grippable" and "grippability" refer to the characteristic of a surface of a container that one is able to hold firmly, without slipping from one's grasp.

As PET has found increasingly more applications in the beverage and consumer goods industry, brand owners are pressed to identify ways to differentiate their products, particularly through packaging innovation. Examples of innovative design features include the use of different textures on the containers and colored containers. While many of these marketing innovations may be conceptually appealing, their implementation may not be practical from a manufacturing, cost or environmental perspective, or the container may possess certain characteristics that would render the design unsuitable in other aspects. For example, colored containers can severely damage the PET recycling stream because they cannot be easily separated from the remaining PET stream. Furthermore, a textured mold is required to make a textured container. Such molds often are very expensive, and it is difficult to change the texture once the mold is created. It therefore would be desirable in the industry to be able to differentiate a PET packaged product without a detrimental impact on the PET recycling stream or an excessive cost increase.

Overmolding or multi-component molding has been widely used in the injection molding industry. Overmolding is essentially defined as a process that produces finished components with two or more thermoplastic based resins by way of injection molding. Overmolding has been used in the cable industry for many years, and has found increasing interest in the industrial and consumer goods industries. In these industries, many applications combine a soft touch material with rigid parts. The soft touch materials provide improved aesthetics, better tactile properties, and improved grippability. The most widely used method of combining a soft and rigid material is by overmolding. Traditionally, overmolding of the soft material directly onto the rigid material creates the finished product part. It would be desirable to provide a way to use soft touch materials with rigid containers, such as beverage containers.

A need therefore exists in the packaging industry to create a container that is easily colored, with controllable gripping functions, insulation functions, and/or other functions, and to achieve these design features without negatively impacting the PET or other thermoplastic recycling stream. Furthermore, there exists a need in the packaging industry to create such a container with a cost-effective process.

SUMMARY OF THE INVENTION

Methods for making an overmolded container and overmolded containers are provided. The overmolded containers advantageously may provide enhanced visual and tactile characteristics, enabling innovative packaging designs, improved grippability and thermal insulation. The methods of manufacture accomplish these container advantages in a cost effective manner, with no or minimal impacting on materials recycling streams.

In one aspect, the method of making the container includes the steps of providing preform for a container, the preform comprising a thermoplastic polymer; overmolding an elastomeric overmold material over at least a portion of the preform to form an overmolded preform; and blow-molding the overmolded preform to form an overmolded container. In a preferred embodiment, the overmolding container is a beverage container.

The preform can be made from a variety of thermoplastic polymers. In one embodiment, the thermoplastic polymer includes one or more polyesters. In a preferred embodiment, the thermoplastic polymer is or includes a polyethylene terephthalate copolymer.

The overmold material is selected to be processible at temperatures and pressures compatible with the blow molding process, so that the overmold material is able to conformingly stretch, with the preform, and take the shape of the resulting blow molded container. In one embodiment, the overmolded material comprises a thermoplastic elastomer. Examples of suitable overmold materials include polyolefin elastomers, polyolefin plastomers, modified polyolefin elastomers, modified polyolefin plastomers, thermoplastic urethane elastomers, and combinations thereof.

In one embodiment, the overmold material has a density less than 1.00 g/cc, which may facilitate ultimate recycling of the thermoplastic polymer, for example, by an aqueous sinkfloat operation that relies on density differences between the thermoplastic polymer and the overmold material.

The overmold material optionally may include one or more additives. Examples of possible additives include colorants, UV blockers, lubricants, slip agents, processing aids, oxidative stabilizers, thermal stabilizers, and combinations thereof.

In one embodiment, the overmolded material covers a majority of the outer surface of the overmolded container.

In another aspect, a blow-molded container is provided. In one embodiment, the container includes a container body having an outer surface and an interior space, wherein the container body is formed by blow molding a thermoplastic polymer preform; and an overmolded layer conformingly secured to at least a portion of the outer surface of the container body.

In one embodiment, the container is a bottle. In one embodiment, the bottle is cylindrical and includes a neck finish with outer threads, disposed between the open ended mouth and a capping flange. In one embodiment, the overmolded layer comprises an overmolding material that covers the base end and sidewalls with the edge of the overmolded layer terminating at the capping flange. In another embodiment, the overmolded layer covers the base end, the sidewalls, and the capping flange.

In still another aspect, a packaged beverage is provided. In one embodiment, the packaged beverage includes a container body having an outer surface and an interior space, wherein the container body is formed by blow molding a thermoplastic polymer preform; an overmolding layer conformingly secured to at least a portion of the outer surface of the container body; and a beverage disposed in the interior space of the container.

In one particular embodiment, a beverage container is provided that includes a blow molded bottle formed from at least a PET copolymer; an overmolded layer comprising an ethylene alpha-olefin resin or other polyolefin elastomers or plastomer, wherein the overmolded layer is conformingly secured to at least a portion of the outer surface of the bottle; and a beverage disposed inside the bottle.

In still another aspect, a method is provided for recycling an overmolded container. In one embodiment, the method includes the steps of chopping the container into a plurality of pieces; and separating the pieces of the overmold material layer from the pieces of the container body and a thermoplastic container material by physical separation method. In one example, the physical separation method comprises an air separation or sink-float process.

BRIEF DESCRIPTION OF THE FIGURES

FIG. 4 is a plan view (FIG. 4A) and a cross-sectional view (FIG. 4B) of one embodiment of an overmolded bottle, wherein the overmolding covers only part of the main body of the bottle.

FIG. 5 is a plan view (FIG. 5A) and a cross-sectional view (FIG. 5B) of one embodiment of an overmolded bottle, wherein the overmolding covers the main body of the bottle and terminating below the capping flange.

DETAILED DESCRIPTION OF THE INVENTION

Overmolded thermoplastic containers and methods of manufacture thereof have been developed. In preferred embodiments, the method of making the containers includes the steps of providing preform for a container, which is made of a thermoplastic polymer; overmolding an elastomeric overmold material over at least a portion of the preform to form an overmolded preform; and then blow-molding the overmolded preform to form the overmolded container, which may be a beverage container. The new methods enable the cost-effective production of a wide variety of containers having an overcoating of a soft touch material, which may provide enhanced visual and tactile characteristics (e.g., vibrant colors, soft-touch feel), innovative packaging designs, improved grippability and/or thermal insulation, among other technical advantages, yet the containers beneficially may be recycled with no or minimal impact on polymer material recycling streams.

In one particular advantage, the relative softness of the elastomeric overmold material allows the outer surface of the overmolded container to be molded with fine details, small and sharp elevational changes in the surface. This permits the container to have, for example, complex textured surfaces, as well as text and pictures, molded into the outer surface. In contrast, such sharp details typically cannot be blow molded into more rigid materials, such as a conventional PET copolymer.

As used herein, the terms "comprise," "comprising," "include," and "including" are intended to be open, non-limiting terms, unless the contrary is expressly indicated.

Methods of Making Overmolded Containers

Figure 1:
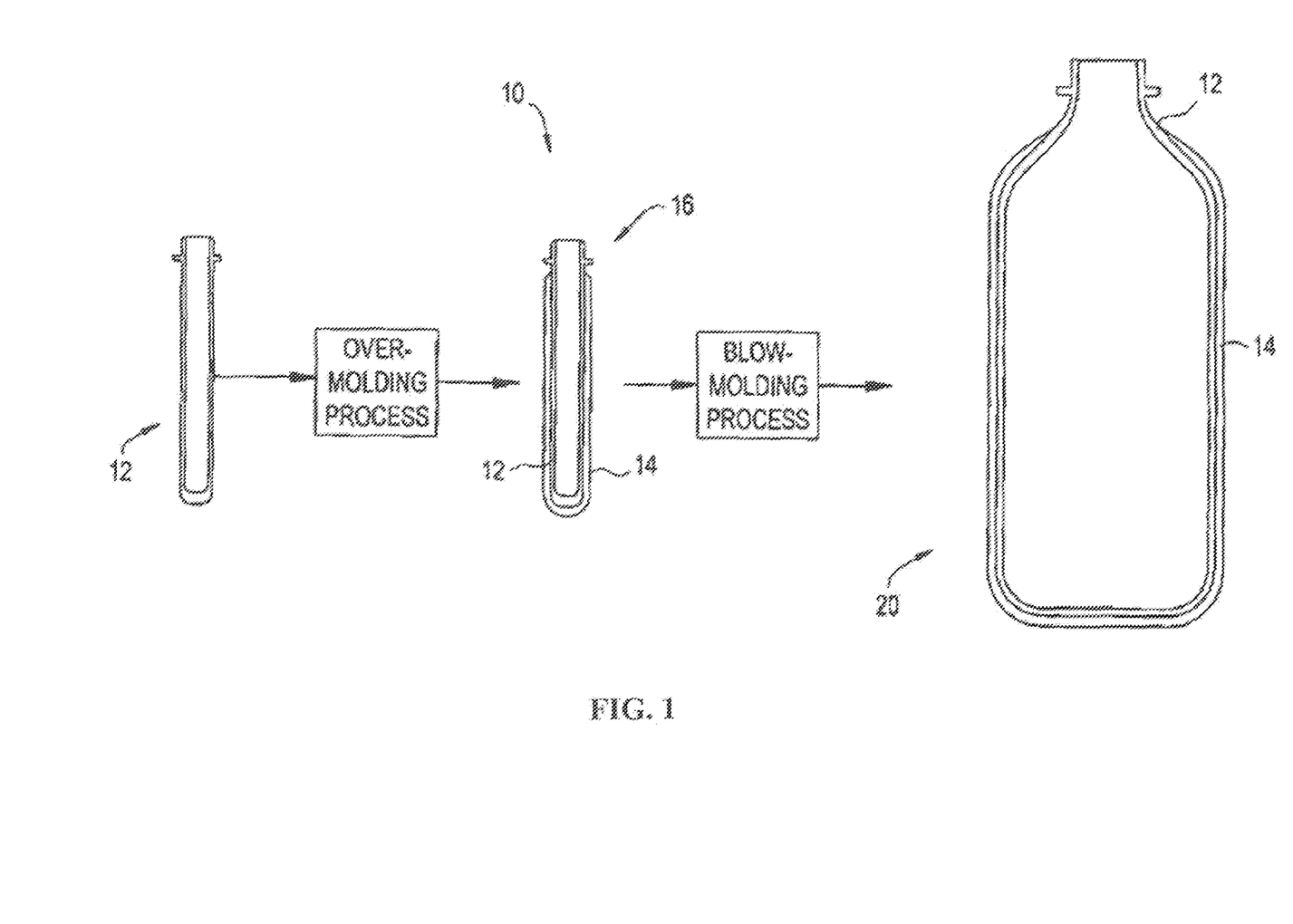
FIG. 1 is process flow schematic of one embodiment of a process for making an overmolded container.

One embodiment of the process is depicted in FIG. 1. FIG. 1 shows the steps of a process 10 for making an overmolded thermoplastic container 20. First, a suitable preform 12 capable of being overmolded is provided. Then, the preform 12 is overmolded, for example using injection molding, with an overmold material 14, forming an overmolded preform 16. Next, the overmolded preform 16 is blow-molded, for example using stretch blow molding.

In preferred embodiments, the preform is made by injection molding of a thermoplastic polymer composition, using techniques and equipment known in the art. In a typical embodiment, a container preform is formed by injection molding a polyester composition into a blowable geometric form. Alternatively, the preform can be made by other known techniques, such as compression molding.

In preferred embodiments, the overmolding is made by injection molding of the overmold material, using techniques and equipment known in the art. For example, the overmolding may be done in the same mold in which the preform is made (e.g., using a two shot molding process or bi-component injection molding process), or the preform can be transferred to a second mold for the overmolding step (e.g., using insert molding). In one embodiment of the overmolding process step, a suitable elastomer is melted and then injection molded over the preform to produce an overmolded preform with an elastomer layer over the original preform. The thickness of the overmold material and the surface area(s) covered by the overmold material may be varied, for example, depending upon the particular design considerations of the ultimate overmolded container.

In an alternative embodiment, the overmolded preform can be made in a single step. For example, a co-injection process as known in the art can be used, in which the thermoplastic polymer and the elastomeric overmold material are simultaneously injected into mold (s) for both preform and overmold structures.

In preferred embodiments, the overmolded preform is transformed into an overmolded container using a stretch blow-molding process, using techniques and equipment known in the art. For example, this process step may include heating the overmolded preform (e.g., in an infrared oven) with a heating profile similar to that of the non-overmolded preform material and then stretch blow-molding the overmolded preform into the final container form with compressed air and stretching rod. Alternatively, the container can be made through a one-step blow molding process, as well known to those skilled in the arts. Certain blow molding parameters may need to be adjusted to accommodate the presence of the overmold material layer; however, these adjustments are within the range of conventional thermoplastics (e.g., PET) processing conditions.

In a particular embodiment, the methods are adapted for making containers for packaging applications in the carbonated and non-carbonated soft drink industry and the food industry. A common manufacturing method for forming these containers includes injection molding container preforms, and then making the containers from the preforms, in single stage or two stage blow molding manufacturing systems. Such methods are well known to those skilled in the art. Examples of possible preform and container structures are disclosed in U.S. Pat. No. 5,888,598, the disclosure of which is incorporated herein by reference. Such methods may be readily adapted to accommodate the presence of an overmolded elastomeric layer on the container preform. In one embodiment, commercially available equipment, as is used in the manufacture of thin walled single use PET beverage containers, may be used to make the overmolded containers described herein. In another embodiment, commercial equipment like that used in manufacturing conventional thick wall refillable PET containers may also be used.

The Thermoplastic Polymer and Preform

The preform can be made from a variety of thermoplastic polymers. In one embodiment, the thermoplastic polymer includes one or more polyesters. In one embodiment, the thermoplastic polymer includes a polypropylene. In a preferred embodiment, the thermoplastic polymer is or includes a polyethylene terephthalate copolymer. In one embodiment, the polyesters are suitable for packaging carbonated or non-carbonated beverages and oxygen sensitive beverages or food products. Suitable polyesters include PET copolymers, polyethylene naphthalate (PEN), polyethylene isophthalate, glycol modified amorphous PET copolymer, (commercially known as PETG), diacid modified amorphous PET, and the like. PET copolymers are particularly useful because they are used in many container applications. As used herein, "PET copolymers" refers to those compositions that comprise a diol component having repeat units from ethylene glycol and a diacid component having repeat units from terephthalic acid. Desirably, in some embodiments, the PET copolymer has less than 20% diacid component modification and/or less than 10% diol component modification, based on 100 mole % diacid component and 100 mole % diol component. Such PET copolymers are well known.

Optionally, a multi-layer preform may be used. For example, the preform could comprise a 3- or 5-layer structure, as known in the art. In one embodiment of a 3-layer preform structure, the middle layer is a barrier layer, the product-contacting layer and the external layer are polyester layers. In one embodiment of a 5-layer preform structure, the inside and outside layer are virgin polyester layers, the second and fourth layers are recycled PET layers, and the third layer is a barrier layer.

In a preferred embodiment, the preform comprises a cylindrical injection-molded preform having an open top end and neck finish. In one embodiment, the preform further comprises a tapered shoulder-forming portion, a middle cylindrical portion of substantially uniform thickness, and a base-forming portion. In various embodiments, the preform is amorphous and substantially transparent.

Figure 2:
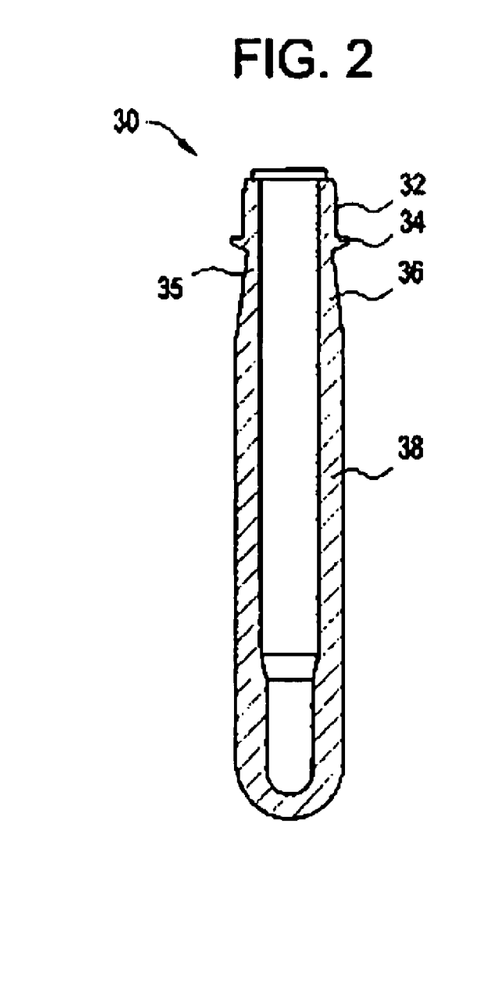
FIG. 2 is a cross-sectional view of one embodiment of a thermoplastic polymer preform for a bottle.

One embodiment of a preform 30 is shown in FIG. 2. This preform 30, which is made by injection molding PET-based resin, includes a threaded neck finish 32, which terminates at its lower end in a capping flange 34. Below the capping flange 34, there is a generally cylindrical section 35 that terminates in a section 36 of gradually increasing external diameter, to provide for an increasing wall thickness. Below the section 36, there is an elongated body section 38.

Overmold Material and Overmolding Process

In preferred embodiments, the overmolding step comprises injection molding of the elastomeric overmold material with, or onto, a container preform. Selection of the elastomeric overmolding material depends on the particular functionality desired for a particular application. For example, the overmold material composition may be selected to achieve a desired texture or soft feel in the hand, a certain grippability, or other functionality. Processing considerations and other factors also impact the selection. For instance, the density, stretch ratio, color, cost, and recyclability of different overmold materials may differ, depending upon the ultimate use or design constraints of the overmolded container.

The amount of surface of the preform covered by the overmold material can vary, depending for example, on the particular design of the container being made. In one embodiment, the overmolded material covers a majority of the outer surface of the overmolded container. For example, the overmold material can cover between 50 and 95% of the exterior surface area of the preform. In other embodiments, the less than 50% of the exterior surface is covered.

As used herein, the term "elastomeric overmold material" refers to a composition comprising a thermoplastic elastomer that can be overmolded at conditions compatible with the preform and a blow molding process. In preferred embodiments, the overmold material is selected to be processible at temperatures and pressures compatible with the blow molding process, so that the overmold material is able to conformingly stretch, with the preform, and take the shape of the resulting blow molded container. The layer of elastomeric overmolded material is separably secured to the underlying thermoplastic polymer structure via mechanical interlock through rough surface or mechanical bonding through functional groups in the elastomers.

The elastomeric overmolded material is selected to be sufficiently soft that it takes the shape of the mold during and after processing. The underlying thermoplastic polymer, once cooled after the blow-molding process, is of sufficient rigidity to maintain the elastomeric overmolded material in its stretched, molded shape.

As used herein, the term "thermoplastic elastomer" includes elastomers, plastomers, modified elastomers, and modified plastomers, as these are known in the art. Representative examples of suitable thermoplastic elastomers, which may be used with conventional injection molding equipment, include polyolefin elastomers (such as ethylene-propylene rubbers), polyolefin plastomers, modified polyolefin elastomers (such as ter-polymers of ethylene, propylene and styrene), modified polyolefin plastomers, thermoplastic urethane elastomers, acrylic-olefin copolymer elastomers, polyester elastomers, and combinations thereof. Specific, but non-limiting, examples of commercially available overmold materials include VERSIFY™ plastomer and AFFINITY™ elastomers from Dow Chemical Company; SARLINK™ and VERSALLOY™ from DSM; DYNAFLEX™, KRATON™, and VERSAFLEX™ from GLS Corporation; SANTO- PRENE™ from Exxon Mobil;TEKLRON™ UNIPRENE™; TEKBOND™; ELEXAR™; MONPRENE™; TEKRON™ from Teknor Apex; and the like. Some of these materials are further described in Batistini, *Macromol. Symp.* 100:137-42 (1995).

In one embodiment, the thermoplastic elastomer desirably has a density less than 1.00 g/cc. This can facilitate separation and recycling of the thermoplastic polymer and/or overmold material.

In one embodiment, the layer of overmolded material on the overmolded container has a thickness of 0.1 mm to 5 mm, preferably from 0.1 mm to 3 mm.

The thermoplastic elastomer desirably has a softness/hardness less than Shore D 45, preferably less than Shore D 30.

In optional embodiments, the overmold material may include one or more additives. Examples of possible additives include pigments and other colorants, UV blockers, lubricants or slip agents, processing aids, anti-oxidants, antimicrobial additives, and thermal stabilizers, as these are known in the art, as well as combinations thereof. In one embodiment, a slip agent is added to improve bottle-to-bottle friction that occurs in a manufacturing process line (e.g., in an air conveyor). In another embodiment, the overmold material may include compounds having functional groups to improve adhesion, if desired, between the overmold layer and the underlying thermoplastic layer.

As will also be apparent, over-molding can include more than one over molding operation to form overmolded preforms using two or more overmolding compositions, if desired. For example, two or more different kinds or colors of elastomer resins could cover different areas of the preform, so that the resulting blow-molded container has parts with different looks or feels.

Figure 3:
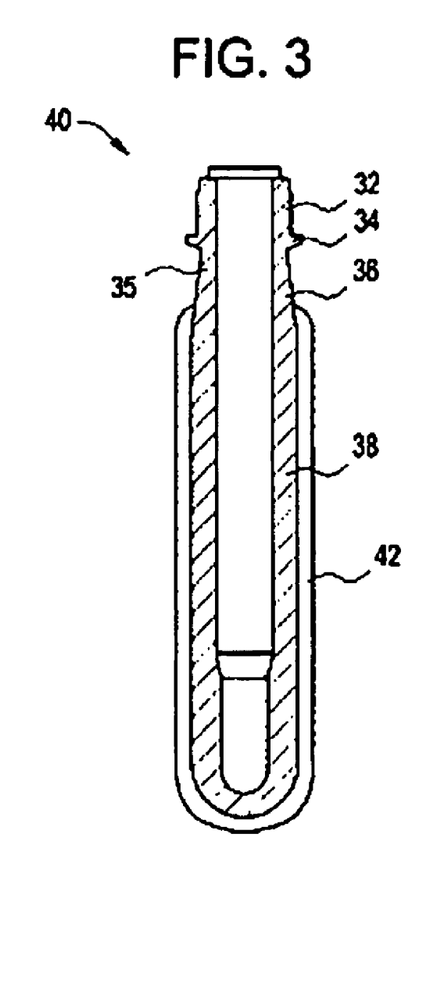
FIG. 3 is a cross-sectional view of one embodiment of an overmolded thermoplastic polymer preform for a bottle.

One embodiment of an overmolded preform 40 is shown in FIG. 3. The depicted overmolded preform 40 includes the base preform 30 shown in FIG. 2, and further includes an elastomeric overmold material 42 on section 38 and part of section 36. In other embodiments (not shown), the overmold material 42 could be formed (overmolded) to cover less or more of the base preform (e.g., covering only part of section 38, or all of sections 38, 36, and 35, etc.) depending upon the container product design considerations.

Blow-Molding

Generally, embodiments of this invention can be made with blow molding. The various methods of blow molding are well known. In a preferred embodiment, the blow-molding process comprises a preform reheat stretch blow mold process, as well known in the art.

In one embodiment, the overmolded preform is placed in a blow molding apparatus having an upper mold section which engages the neck finish, a middle mold section having an interior cavity forming the shape of the container side wall, and a lower mold section having an upper surface forming the outwardly concave dome portion of the container base. In a preferred embodiment, the base material is PET copolymer. In accordance with a conventional reheat stretch blow mold process, the injection-molded preform is first reheated to a temperature suitable for stretching and orientation (e.g., 80 to 130° C.), placed in the blow mold, and an axial stretch rod is then inserted into the open upper end and moved downwardly to axially stretch the preform. Subsequently or simultaneously, an expansion gas is introduced into the interior of the preform to radially expand the shoulder, sidewall and base forming portions outwardly into contact with the interior surfaces of mold sections. The resulting blown container has the same neck finish with outer threads and lowermost neck flange as the preform. The remainder of the bottle undergoes expansion, although to varying degrees. Typically, the overmold material expands and stretches with the base preform in a proportional manner.

Overmolded Containers

A wide variety of overmolded, blow molded container can be made. The overmolded container may be used for essentially any food, beverage, personal care, or pharmaceutical product. Representative examples of suitable types of overmolded containers include bottles, jars, drums, carafes, coolers, and the like.

In one embodiment, the container includes a container body having an outer surface and an interior space, wherein the container body is formed by blow molding a thermoplastic polymer preform; and an overmolding layer conformingly secured to at least a portion of the outer surface of the container body. In one embodiment, the container body comprises a base end, an open ended mouth, and sidewalls extending from the base end to the open ended mouth.

In a preferred embodiment, the container is a bottle. In one embodiment, the bottle is cylindrical and includes a neck finish with outer threads, disposed between the open ended mouth and a capping flange. In one embodiment, the overmolded material covers the base end and sidewalls with the edge of the overmolded material terminating at the capping flange. In another embodiment, the overmolded material covers the base end, the sidewalls, and the capping flange.

Figure 4A:
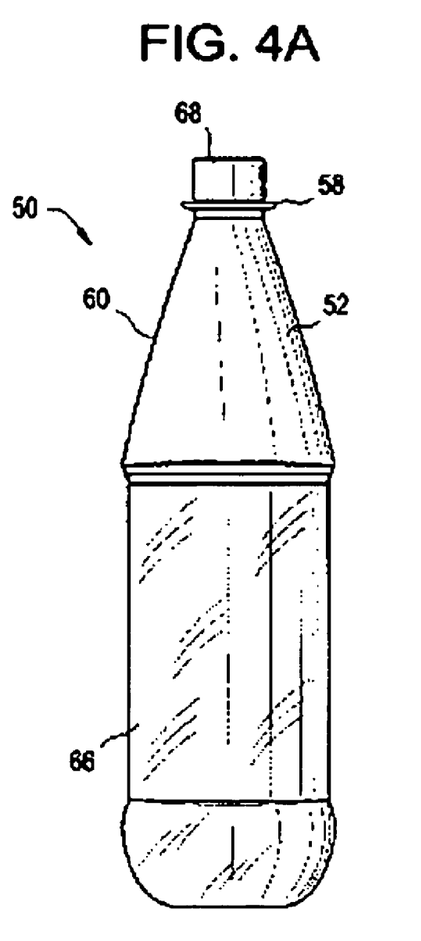
Figure 4B:
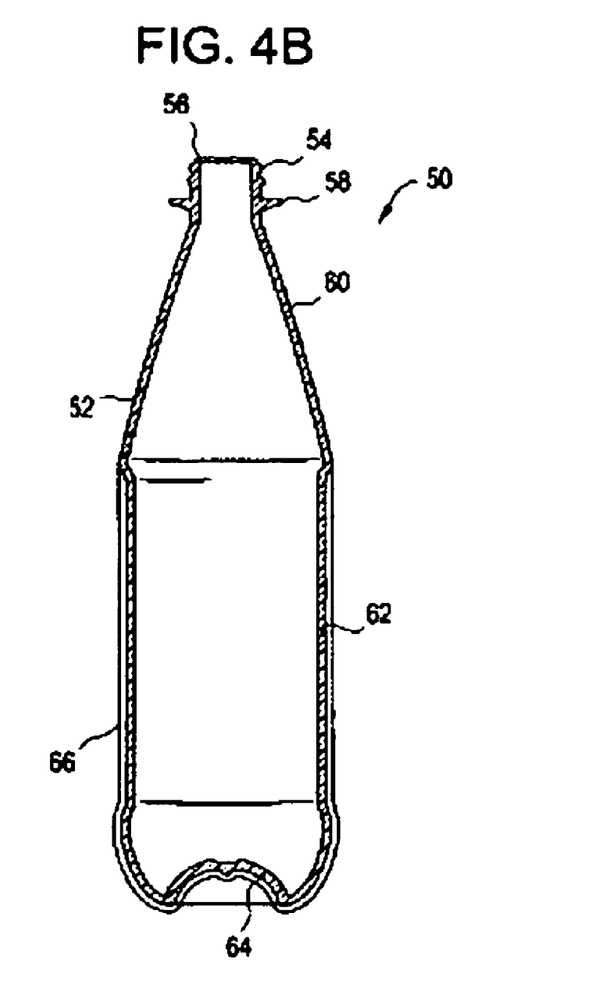

One embodiment of an overmolded container is shown in FIGS. 4A-B. The container 50 includes a thermoplastic polymer body 52 that comprises a threaded neck finish 54 defining a mouth 56, a capping flange 58 below the threaded neck finish, a tapered section 60 extending from the capping flange, a body section 62 extending below the tapered section, and a base 64 at the bottom of the container. The container 50 includes an overmolding layer 66 that covers section 62, but not section 60. Following filling of the container with a product (e.g., a beverage), a closure 68 seals the mouth 56 of the container 50.

Figure 5A:
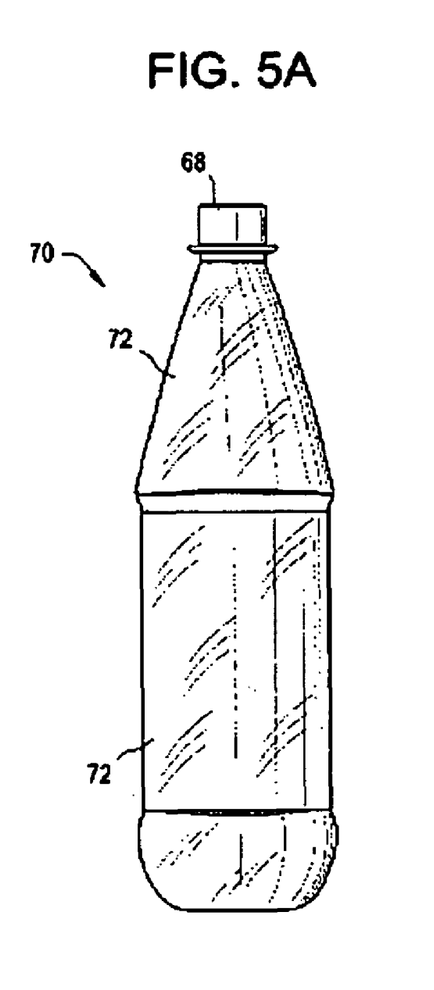
Figure 5B:
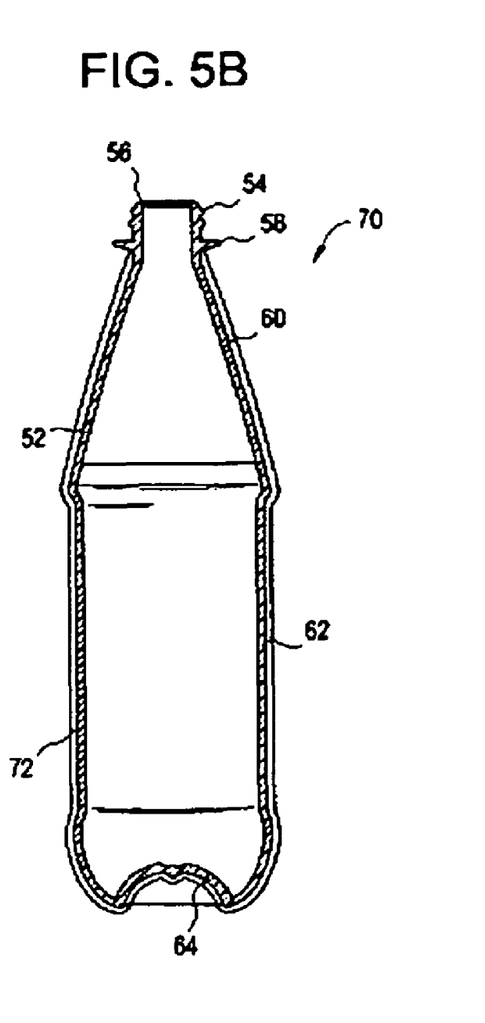

Another embodiment of an overmolded container is shown in FIGS. 5A-B. The container 70 includes a thermoplastic polymer body 52 that comprises a threaded neck finish 54 defining a mouth 56, a capping flange 58 below the threaded neck finish, a tapered section 60 extending from the capping flange, a body section 62 extending below the tapered section, and a base 64 at the bottom of the container. The container 70 includes an overmolding layer 72 that covers section 62 and section 60, terminating below the capping flange 58. Following filling of the container with a product (e.g., a beverage), a closure 68 seals the mouth 56 of the container 70.

Figure 6:
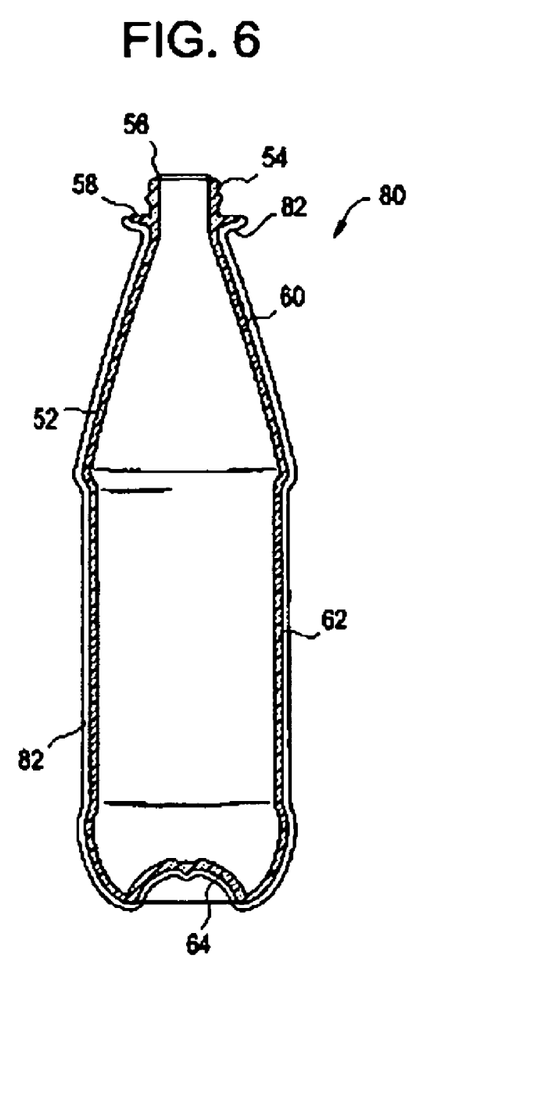
FIG. 6 is a cross-sectional view of one embodiment of an overmolded bottle, wherein the overmolding covers the main body of the bottle and extends onto the capping flange.

Another embodiment of an overmolded container is shown in FIG. 6. The container 80 includes a thermoplastic polymer body 52 that comprises a threaded neck finish 54 defining a mouth 56, a capping flange 58 below the threaded neck finish, a tapered section 60 extending from the capping flange, a body section 62 extending below the tapered section, and a base 64 at the bottom of the container. The container 80 includes an overmolding layer 82 that covers section 62 and section 60, and extends onto the capping flange 58.

Packaged Beverage

In one particular embodiment, a packaged beverage is provided, which includes the overmolded container. The beverage product may be pressurized (e.g., carbonated soft drink, beer) or non-pressurized (e.g., still water, juice, sports drink). The overmolded container may be used with cold-fill or hot-fill products.

In one embodiment, the packaged beverage includes a container body having an outer surface and an interior space, wherein the container body is formed by blow molding a thermoplastic polymer preform; an overmolding layer conformingly secured to at least a portion of the outer surface of the container body; and a beverage disposed in the interior space of the container. The container body typically includes an opening and a removably securable closure therefor.

In one particular embodiment, a beverage container is provided that includes a blow molded bottle formed from at least a PET copolymer; an overmolded layer comprising an olefin-based TPE resin, wherein the overmolded layer is conformingly secured to at least a portion of the outer surface of the bottle; and a beverage disposed inside the bottle.

Figure 7:
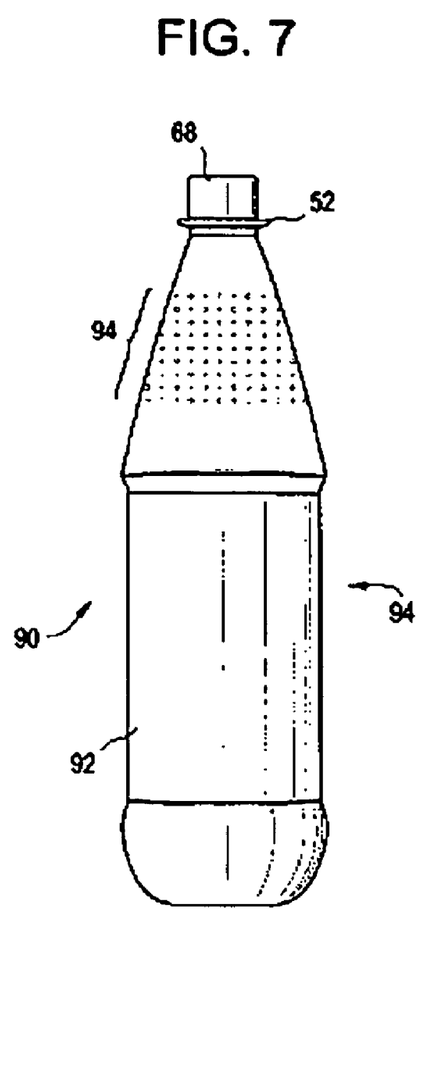
FIG. 7 is a plan view of one embodiment of a packaged beverage, in an overmolded bottle with stippling on a portion of the surface of the overmolded material.

One embodiment of a packaged beverage is depicted in FIG. 7. The packaged beverage 90 includes an overmolded bottle 94 comprising a thermoplastic polymer body 52 that has overmolding 92 with stippled area 94 molded into a portion of the surface of the overmolded material 92.

The stippling of FIG. 7 is exemplary of the fine level of detail that can be molded into the surface of the overmolded material by virtue of its softness and moldability relative to that of the underlying rigid thermoplastic polymer. The stippling or other molded textures can be provided for aesthetic design purposes or for enhanced grippability of the bottle or other container. In other examples, such molded details can be formed at other areas of the overmolding. In addition, the molded details can take the form of text or pictures. Typically, these fine molded details are formed only into the overmold material and do not extend to the underlying thermoplastic polymer.

Recycling Methods

Advantageously, the overmolded containers may be recycled. In preferred embodiments, the recycling methods include a process step wherein the overmold material and the thermoplastic polymer, preferably PET copolymer are physically separated, for example using one or more conventional techniques such as are known in PET recycling processes. In one embodiment, the method includes the steps of chopping (e.g., grinding, shredding, cutting, etc.) the containers into a plurality of pieces (sometimes called flakes); and then separating the pieces of the overmold material layer from the pieces of the container body and the thermoplastic container material by physical separation method. In one example, the physical separation method comprises an air separation or sink-float process. In one embodiment of a sink-float process, pieces of the elastomeric overmold material float on top of a water bath, while pieces of the thermoplastic base polymer (e.g., PET copolymer) sink to the bottom of the water bath.

Figure 8:
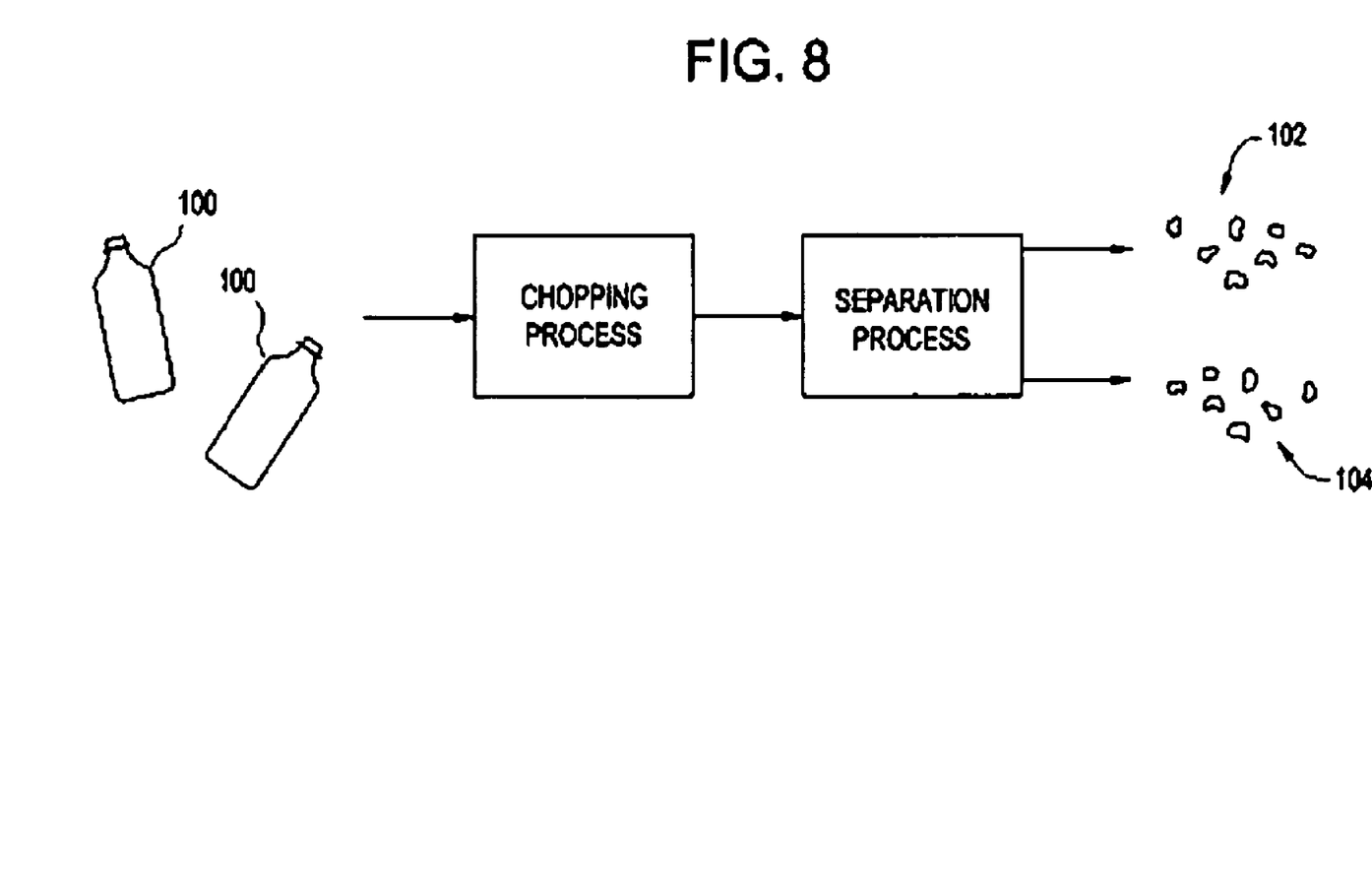
FIG. 8 is a process flow diagram illustrating one embodiment of a process for use in recycling an overmolded thermoplastic container.

One example of a recycling process for overmolded container is illustrated in FIG. 8. The overmolded containers 100 are fed to a chopping process wherein the containers are cut, chopped, shred, or ground into many small pieces or particles. These pieces/particles then are fed to separation process wherein the pieces/particles of overmold material 102 (e.g., elastomer) separate from the pieces/particles of thermoplastic polymer 104 (e.g., PET copolymer).

The methods and articles of manufacture can be further understood with the following non-limiting examples.

EXAMPLE 1

AFFINITY™ PF 1140G Overmolded 500 ml PET Bottle

An overmolded 500 ml bottle was made as follows. All injection molding was performed in a lab scale Arburg single cavity injection molding equipment. First, a preform was made from a commercial CSD grade PET (Invista, Spartanburg, S.C.), which was dried in a vacuum oven at 140° C. overnight to a moisture level less than 50 ppm. A 16-g PET preform was made by injection molding at a melt temperature of 270° C.

The overmold material was an AFFINITY™ PF 1140G resin (an ethylene based thermoplastic plastomer) (Dow Chemical Company). In the overmolding step, the PET preform was transferred and placed in a cavity where the overmold material was then injection molded onto the PET preform at a barrel temperature of 212° C. Red and silver colored overmolded bottles were made by adding red and silver colorants to the AFFINITY™ PF 1140G prior to overmolding of some of the bottles.

Then, the overmolded preform was transferred to a lab scale SBO 1 blow molding machine. The overmolded preform was heated to a temperature from 90 to 100° C., and blown into a 500 ml bottle in a 500 ml bottle mold.

The overmolded thermoplastic bottles exhibited good grippability and recognizable red and silver colors in the colored samples.

EXAMPLE 2

TEKBOND™ 6000-45 Overmolded 500 ml PET Bottle

The process described in Example 1 was repeated, but using a TEKBOND™ 6000-45 resin (a thermoplastic elastomer) (Teknor Apex) as the overmold material overmolded at a barrel temperature of 158 to 165° C. The overmolded preform was then blown into a 500 ml bottle in a 500 ml bottle mold. Colored overmolded bottles were made by adding red or silver colorant to the Tekbond 6000-45 resin prior to overmolding. The overmolded bottles exhibited good grippability, color, and soft hand feeling.

EXAMPLE 3

Thermal Insulation Characteristic of Overmolded Container

Figure 9:
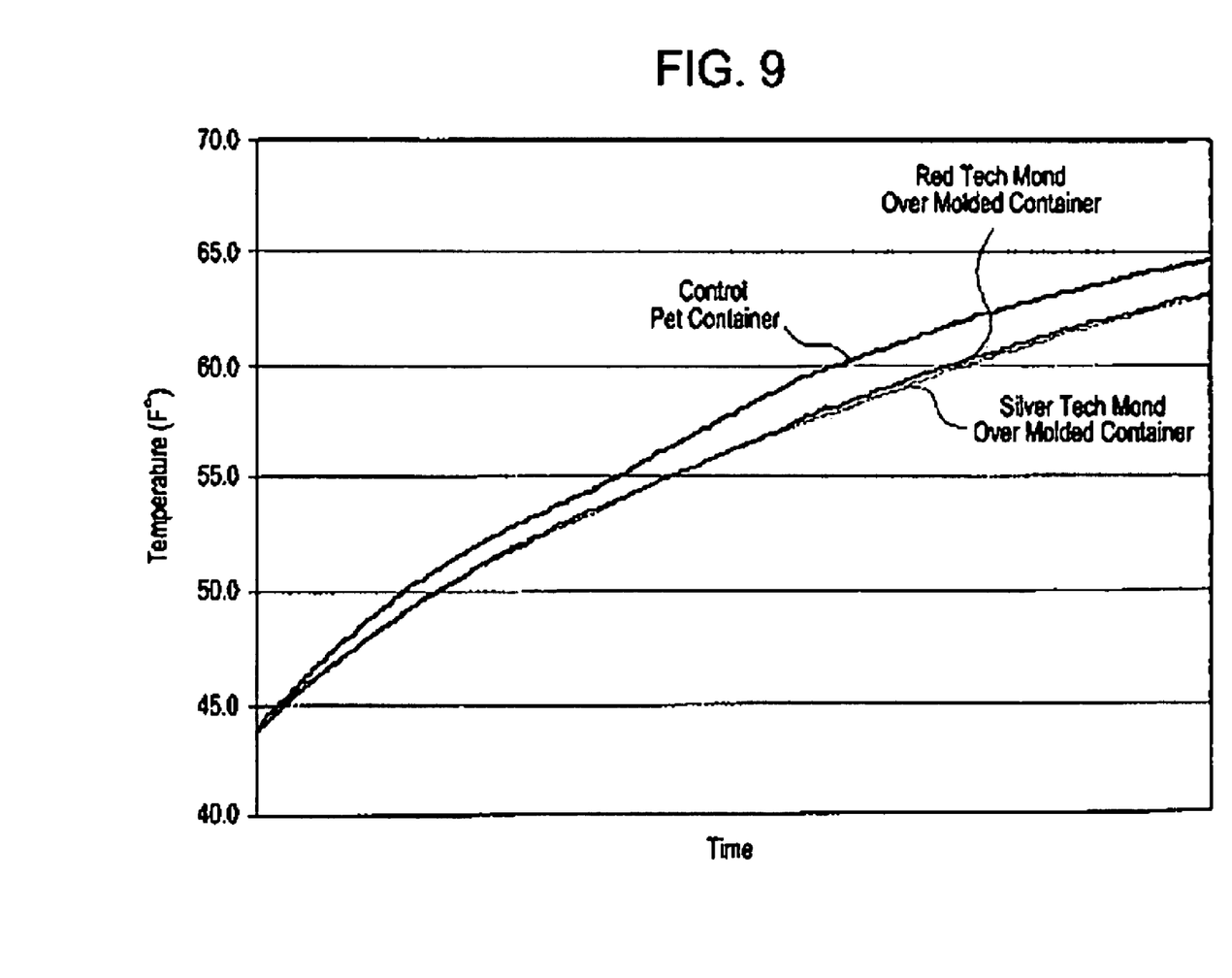
FIG. 9 is a graph (temperature vs. time) comparing the thermal insulation properties of one embodiment of two examples of overmolded thermoplastic containers versus a non-PET container.

Containers made as described in Example 2 were tested to determine how well the containers could reduce the rate of heat transfer into the container. The overmolded container and a non-overmolded PET container were filled with chilled water and allowed heat up to room temperature. The water temperature was measured to generate a plot of temperature vs. time. As shown in FIG. 9, the overmolded PET container demonstrated an ability to maintain a colder temperature longer than the non-overmolded PET container, demonstrating a better insulation property.

EXAMPLE 4

Recyclability of PET Bottle with AFFINITY™ PF1140G Overmold

The overmolded bottles made in Example 1 were cut in pieces as in a simulated recycling process, and the pieces were immersed in water. The red or silver pieces of the Affinity PF1140G resin floated to the top of the water and the clear pieces of the PET pieces dropped to the bottom of the water instantly. The overmolded resin and PET pieces were separated with water without any difficulty. This process simulated the sink-float process in a conventional PET recycling separation.

EXAMPLE 5

Recyclability of PET Bottle with TEKBOND™ 6000-45 Overmold

The overmolded bottles made in Example 2 were cut in pieces as in a recycling process, and the pieces were immersed in water. The red or silver pieces of the TEKBOND™ 6000-45 resin floated to the top of the water and the clear pieces of the PET pieces dropped to the bottom of the water instantly. The overmolded resin and PET pieces were separated with water without any difficulty. This process simulated the sink-float process in a conventional PET recycling separation.

EXAMPLE 6

Various Overmolded Bottle Structures and Polymers

The general processes described in Examples 1 and 2 were repeated using different colorants (including black, yellow, and blue) and different shaped bottles, and varying amounts of coverage of overmolding on the bottles. Different elastomers also were used, including some acrylic-olefin copolymer elastomers.

In some cases, the overmolding covered substantially the entire bottle below the neck line, and in others cases, the overmolding covered only the lower half of the bottle.

Publications cited herein are incorporated by reference. Modifications and variations of the methods and devices described herein will be obvious to those skilled in the art from the foregoing detailed description. Such modifications and variations are intended to come within the scope of the appended claims.

What is claimed is:

1. A method for making an overmolded container comprising:
    providing a preform for a container, the preform comprising a thermoplastic polymer;
    overmolding an elastomeric overmold material over at least a portion of the preform to form an overmolded preform; and
    stretch blow-molding the overmolded preform to form an overmolded container, wherein the stretch blow-molding functions to conformingly and separably secure the elastomeric overmold material to at least a portion of an outer surface of the container.

2. The method of claim 1, wherein the overmolding container is a beverage container.

3. The method of claim 1, wherein the thermoplastic polymer comprises one or more polyesters.

4. The method of claim 3, wherein the thermoplastic polymer comprises a polyethylene terephthalate copolymer.

5. The method of claim 1, wherein the overmold material comprises a thermoplastic elastomer.

6. The method of claim 1, wherein the overmold material is selected from the group consisting of polyolefin elastomers, polyolefin plastomers, modified polyolefin elastomers, modified polyolefin plastomers, and combinations thereof.

7. The method of claim 1, wherein the overmold material is selected from the group consisting of acrylic-olefin copolymer elastomers, polyester elastomers, and combinations thereof.

8. The method of claim 1, wherein the overmold material has a density less than 1.00 g/cc.

9. The method of claim 1, wherein the overmold material further comprises one or more additives.

10. The method of claim 9, wherein the one or more additives are selected from the group consisting colorants, UV blockers, lubricants, slip agents, processing aids, anti-oxidants, antimicrobial agents, thermal stabilizers, and combinations thereof.

11. The method of claim 1, wherein the blow molding process comprises preheating the overmolded preform and then stretch blow molding the preheated preform.

12. The method of claim 1, wherein the overmolded material covers a majority of the outer surface of the overmolded container.

13. A blow molded container comprising:
    a container body having an outer surface and an interior space, wherein the container body is formed by stretch blow molding a thermoplastic polymer preform; and
    an overmolded layer, which comprises a thermoplastic elastomer, conformingly and separably secured to at least a portion of the outer surface of the container body.

14. The container of claim 13, wherein the container body is in the shape of a bottle comprising one or more sidewalls, a closed base end, and an open mouth end.

15. The container of claim 13, wherein the thermoplastic polymer comprises one or more polyesters.

16. The container of claim 13, wherein the thermoplastic polymer comprises a polyethylene terephthalate copolymer.

17. The container of claim 13, wherein the overmolded layer comprises an overmold material selected from the group consisting of polyolefin elastomers, polyolefin plastomers, modified polyolefin elastomers, modified polyolefin plastomers, and combinations thereof.

18. The container of claim 13, wherein the overmolded layer comprises an overmold material selected from the group consisting of acrylic-olefin copolymer elastomers, polyester elastomers, and combinations thereof.

19. The container of claim 13, wherein the overmolded layer comprises an overmold material having a density less than 1.00 g/cc.

20. The container of claim 13, wherein the overmold layer further comprises one or more additives.

21. The container of claim 20, wherein the one or more additives are selected from the group consisting of colorants, UV blockers, lubricants, slip agents, processing aids, antioxidants, antimicrobial agents, thermal stabilizers, and combinations thereof.

22. The container of claim 13, wherein the overmolded layer covers a majority of the outer surface of the overmolded container.

23. The container of claim 13, wherein the overmolded layer has a thickness of 0.1 mm to 5 mm.

24. The container of claim 14, wherein the bottle is cylindrical and includes a neck finish and a capping flange, the neck finish comprising outer threads disposed between the open mouth end and the capping flange.

25. The container of claim 24, wherein the overmolded layer covers the base end and sidewalls with an edge of the overmolded layer terminating at the capping flange.

26. The container of claim 24, wherein the overmolded layer covers the base end, the sidewalls, and the capping flange.

27. The container of claim 13, wherein the overmolded layer has a hardness less than Shore D 30.

28. A packaged beverage comprising:
    the container of claim 13; and
    a beverage disposed in the interior space of the container.

29. A packaged beverage comprising:
a stretch blow molded bottle formed from at least a PET copolymer;
an overmolded layer comprising a thermoplastic elastomer, wherein the overmolded layer is conformingly and separably secured over at least a portion of the outer surface of the bottle; and
a beverage disposed inside the bottle.

30. The packaged beverage of claim 29, wherein the thermoplastic elastomer comprises a polyolefin plastomer.

31. The packaged beverage of claim 29, wherein the overmolded layer is separable from the PET copolymer by a mechanical process.

32. A method for recycling an overmolded container comprising:
chopping the container of claim 13 into a plurality of pieces; and
using a mechanical separation process to separate the pieces of the overmolded layer from the pieces of the container body.

33. The method of claim 32, wherein the mechanical separation process comprises an air separation process or a sink-float separation process.

34. A bottle comprising:
a body having an outer surface and an interior space, wherein the body is formed by blow molding a polyester preform; and
an overmolded layer, which comprises a thermoplastic elastomer, conformingly stretched and separably secured, by the stretch blow molding to, at least a portion of the outer surface of the body.

35. The bottle of claim 34, wherein the bottle comprises one or more sidewalls, a closed base end, an open mouth end opposing the closed base end, a neck finish, and a capping flange, the neck flange comprising outer threads disposed between the open mouth end and the capping flange, and wherein the overmolded layer covers the base end, the sidewalls, and the capping flange.

36. A method for making an overmolded container comprising:
providing a preform for a container, the preform comprising a polyester;
overmolding an elastomeric overmold material over at least a portion of the preform to form an overmolded preform; and
stretch blow-molding the overmolded preform to form an overmolded container,
wherein the elastomeric overmold material is the outermost surface of at least a portion of the overmolded container.

37. The method of claim 36, wherein the elastomeric overmold material is selected from the group consisting of polyolefin elastomers, polyolefin plastomers, and combinations thereof.

38. The method of claim 1, wherein the elastomeric overmold material is separably secured to the underlying thermoplastic polymer via mechanical interlock through rough surface or mechanical bonding through functional groups in the layer of the elastomeric overmold material.

39. A bottle comprising:
a blow molded body having an outer surface and an interior space, the body being formed of a PET copolymer or another polyester; and
an overmolded layer, which consists essentially of a thermoplastic elastomer, conformingly stretched and secured via mechanical interlock or through rough surface or mechanical bonding through functional groups in the thermoplastic elastomer to at least a portion of the outer surface of the body.

* * * * *